United States Patent [19]
Branger et al.

[11] Patent Number: 6,103,154
[45] Date of Patent: *Aug. 15, 2000

[54] METHOD OF MOLDING CROSS-LINKED FOAMED COMPOSITIONS

[75] Inventors: Robert Michael Branger, Nashua, N.H.; David N. Fortier, Fall River, Mass.

[73] Assignee: Reebok International Ltd., Canton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 09/031,643

[22] Filed: Feb. 27, 1998

[51] Int. Cl.⁷ ...................................................... B29C 44/02
[52] U.S. Cl. ................................ 264/54; 264/85; 264/102
[58] Field of Search ............................... 264/54, 500, 85, 264/102

[56] References Cited

U.S. PATENT DOCUMENTS

| | | | |
|---|---|---|---|
| 2,774,991 | 12/1956 | McCurdy et al. | 264/85 |
| 3,389,198 | 6/1968 | Taber . | |
| 3,470,119 | 9/1969 | Benning et al. | 264/85 |
| 3,812,225 | 5/1974 | Hosoda et al. . | |
| 3,878,279 | 4/1975 | Sorrells et al. | 264/54 |
| 3,997,494 | 12/1976 | Lever et al. . | |
| 4,091,062 | 5/1978 | Nelson . | |
| 4,112,519 | 9/1978 | Kruder . | |
| 4,208,368 | 6/1980 | Egli | 264/45.5 |
| 4,224,432 | 9/1980 | Pechhold et al. . | |
| 4,302,272 | 11/1981 | Phillips et al. | 264/46.4 |
| 4,436,679 | 3/1984 | Winstead . | |
| 4,447,373 | 5/1984 | Chappell et al. | 264/85 |
| 4,675,141 | 6/1987 | Kumazaki | 264/85 |
| 4,824,732 | 4/1989 | Hendry et al. . | |
| 4,952,365 | 8/1990 | Shibuya et al. | 264/45.5 |
| 5,093,053 | 3/1992 | Eckardt et al. | 264/572 |
| 5,286,784 | 2/1994 | Inoue et al. . | |
| 5,298,546 | 3/1994 | Kirsch et al. . | |
| 5,385,462 | 1/1995 | Kodama et al. . | |
| 5,422,061 | 6/1995 | Takahashi et al. . | |
| 5,503,919 | 4/1996 | Litchholt et al. . | |
| 5,700,407 | 12/1997 | Branger | 264/54 |
| 5,709,954 | 1/1998 | Lyden et al. . | |

FOREIGN PATENT DOCUMENTS

| | | |
|---|---|---|
| 0 186 110 A1 | 7/1986 | European Pat. Off. . |
| 52-21071 | 2/1977 | Japan . |
| 56-121739 | 9/1981 | Japan . |
| 57-82026 | 5/1982 | Japan . |
| 61-172711 | 8/1986 | Japan . |
| 61-244515 | 10/1986 | Japan . |
| 3-86513 | 4/1991 | Japan . |
| 3-169622 | 7/1991 | Japan . |
| 3-248826 | 11/1991 | Japan . |

*Primary Examiner*—Allan R. Kuhns
*Attorney, Agent, or Firm*—Sterne, Kessler, Goldstein & Fox P.L.L.C.

[57] ABSTRACT

A method for injection-molding a cross-linked, foamed composition including the introduction of an inert gas into a mold chamber of a preheated mold to evacuate air and oxygen from the mold chamber. A mixture of a resin, a cross-linking agent and a chemical blowing agent are introduced into the mold chamber after the inert gas has evacuated air and oxygen from the mold chamber. The inert gas is evacuated from the mold chamber while the mixture substantially fills the mold chamber. The mixture is heated within the mold chamber to a temperature sufficient to thermally decompose the chemical blowing agent. The temperature of the mixture is maintained within the mold chamber until the resin substantially forms a cross-linked composition. The mold is opened and the cross-linked composition foams to produce a finished product that is free of oxidation.

49 Claims, 3 Drawing Sheets

METHOD OF MOLDING CROSS-LINKED FOAMED COMPOSITIONS

BACKGROUND OF THE INVENTION

1. Field of the Invention

The present invention relates to a method of injection molding a cross-linked foamed composition. In particular, the present invention relates to the use of inert gas to evacuate oxygen from hot molds to minimize deleterious effects during molding, such as oxidation. The present invention further includes an apparatus to perform this method of injection molding.

2. Related Art

Thermoplastic materials are often molded by the process of injection molding. Conventionally, a polymer is preheated in a cylindrical chamber to a temperature at which it will flow and then forced into a relatively cold, closed mold chamber under high pressures to distribute the material without voids. Once the polymer melt has solidified in the cool mold, the mold is opened and the molded article is removed. Such methods, however, are not conducive to the production of foamed cross-linked polymers.

Foamed cross-linked polymers are produced by generating a gas in a fluid polymeric material, usually within a hot mold maintained at an elevated temperature. Thermoplastics may be foamed by incorporating a chemical blowing agent, which decomposes to a gas at elevated temperature.

Inert gas at a high pressure, for example, 500 psi and greater, provides back-pressure upon the fluid polymeric material to prevent initial foaming and oxidation. The pressure is then released and the article foams quickly. This process is more complicated because it requires the use of higher pressure machine tooling which requires increased maintenance. Furthermore, this process is fairly inaccurate. The final dimensions vary because it is difficult to accurately control the foaming upon release from the mold.

The preferred method for injection-molded cross-linked compositions involves placing or injecting a mixture of the polymeric material and the chemical blowing agent into a hot mold that is maintained at an elevated temperature higher than the decomposition temperature of the chemical blowing agent. The hot mold is filled with the mixture, held together by a press, and opened after the chemical blowing agent is activated by the elevated temperature.

Detrimental oxidation may occur while forming foamed compositions using hot molds. For example, oxidation may occur if oxygen is present in the mold chamber while the mixture is injected into the hot mold and the chemical blowing agent is activated. Such oxidation may cause burning and discoloration of the compound resulting in a defective article. As known in the art and depending on design, it is possible to have up to approximately ninety percent of products produced by injection molding in a hot mold undergo such burning and discoloration. These discolored articles often must be discarded as "rejects," resulting in waste and expense in the manufacture of foamed compositions.

A vacuum system could be used alone to evacuate oxygen from hot molds. Such vacuum systems used alone, however, are not effective because they fail to evacuate the oxygen completely from the mold. As the hot molds wear after repeated use they fail to tightly seal and the parting lines of the molds tend to misalign thereby causing tool leakage. Such tool leakage may inadvertently cause the vacuum system to draw air containing oxygen into the mold chamber. Also, vacuum systems alone are ineffective as molding designs become more complicated due to the presence of deeper cavities which tend to entrap oxygen.

What is needed is a method to evacuate oxygen from hot molds during injection molding to reduce the possibility of oxidation of the molded article.

SUMMARY OF THE INVENTION

The method of molding cross-linked foamed compositions of the present invention utilizes inert gas to effectively evacuate air, and particularly oxygen, present in a hot mold during the molding process. Prior to the introduction of a mixture containing a selected resin, chemical blowing agent, and cross-linking agent into the hot mold, inert gas is introduced into the hot mold to evacuate air from the mold thereby minimizing oxidation of the molded composition.

According to the method of the present invention, a hot mold is preheated to a temperature higher than the respective decomposition and activation temperatures of the selected blowing and cross-linking agents. An inert gas is introduced into a mold chamber of the preheated hot mold at a predetermined pressure to evacuate substantially all air from the mold chamber. The mixture of the selected resin, chemical blowing agent, and cross-linking agent is provided at a temperature that is lower than the respective decomposition and activation temperatures of the selected blowing and cross-linking agents and introduced into the preheated hot mold. The mixture can be introduced into the mold chamber in either the same direction or an opposing direction of the inert gas. The inert gas is then evacuated from the mold chamber while the mixture substantially fills the mold chamber thereby minimizing voids in the molded composition. The mixture is then heated by the hot mold to a temperature which is sufficient to decompose the selected chemical blowing agent. The temperature of the mixture is maintained within the hot mold until the selected resin is substantially cross-linked thereby forming the foamed composition.

It is an object of the present invention to minimize burning and discoloration of cross-lined foamed compositions due to oxidation using a chemical blowing agent. This and other objects of the invention will become apparent from the detailed description and examples which follow.

DETAILED DESCRIPTION OF THE PREFERRED EMBODIMENTS

Figure 1:
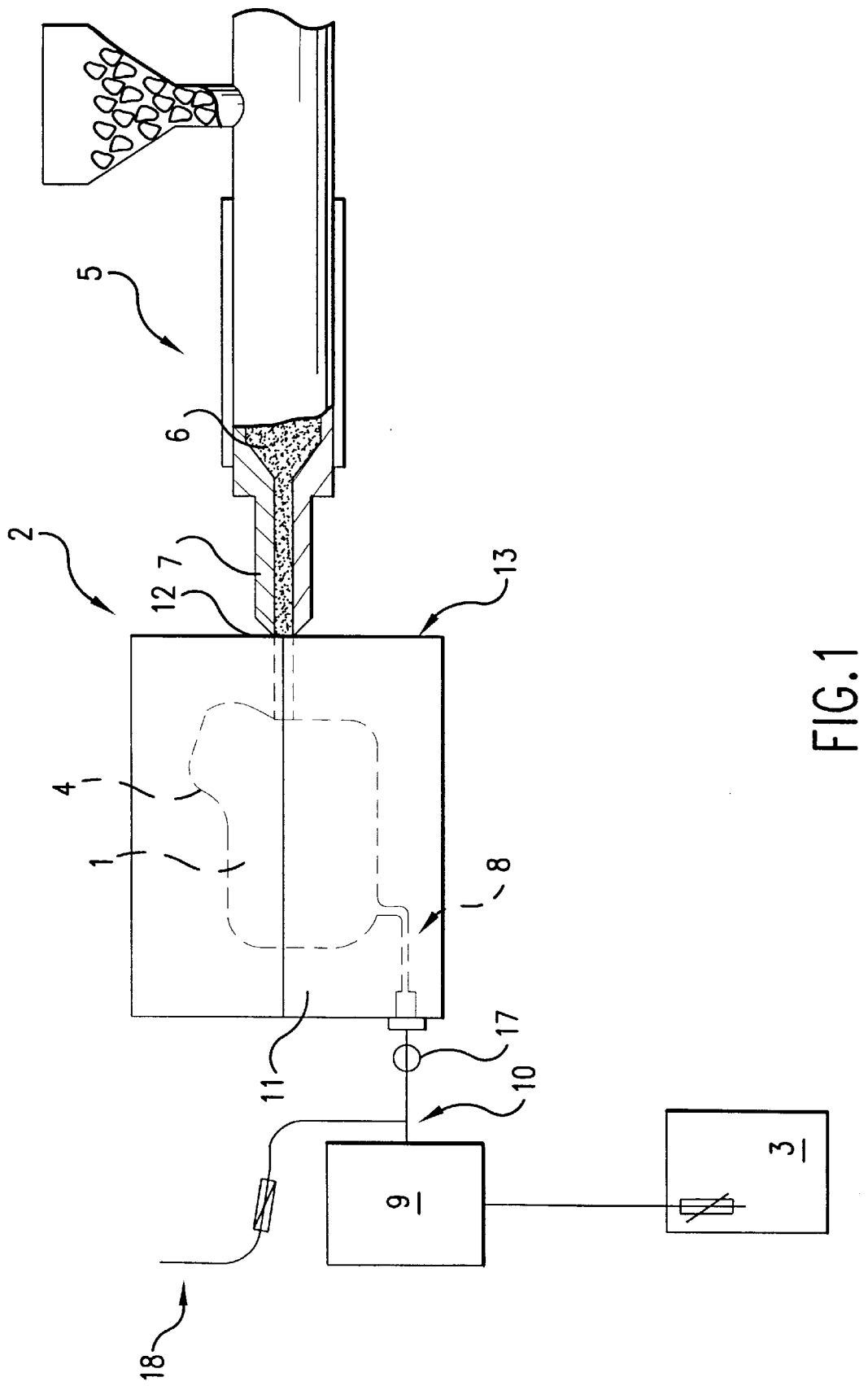
FIG. 1 is a schematic representation of the apparatus used to practice a first embodiment of the present invention.

The preferred embodiments of the present invention are now described. While specific materials and method steps are discussed, it should be understood that this is done for illustrative purposes only. A person skilled in the relevant art will recognize that other materials and method steps can be used.

The present invention is applicable to injection-molding cross-linked foamed compositions of a wide variety of resins, including polymers. Such polymers may include, for example polyolefins such as polyethylene and polypropylene; ethylene copolymers and terpolymers such as ethylene vinyl acetate copolymer; thermoplastic and thermosetting elastomers; polyesters such as polyethylene terephthalate and polybutylene terephthalate; as well as mixtures of two more of such polymers. Preferred resins include polyolefins and ethylene vinyl acetate copolymers.

The foamed composition is prepared by mixing a selected resin to be foamed with a cross-linking agent and a chemical blowing agent. Cross-linking agents which can be used will depend on the particular resin used. Exemplary cross-linking agents include peroxide and sulfur. Chemical blowing agents which can be used will also depend upon the particular resin used, but, can include azobisisobutyronitrile, azodicarbonamide, P-toluene sulfonylhydrazide, 4,4'-oxybis (benzenesulfonylhydrazide) N,N-dinitrosopentamethylenetetramine and sodium bicarbonate, modified azodicarbonamides, hydrazides, and 5-phenyltetrazole. Dicumyl peroxide and modified azodicarbonamides, respectively, are the preferred cross-linking and chemical blowing agents for use with the above noted preferred resins.

The amounts of cross-linking agent and chemical blowing agent used may vary. Typically, the cross-linking agent will be used in quantities of about 0.5 to 3.0 parts per 100 parts of the resin. The amount of chemical blowing agent used will vary upon the desired density of the final foamed article. However, the amount of the chemical blowing agent will be about 1–10 parts of chemical blowing agent per 100 parts of resin. Preferably, about 2 to 5 parts of chemical blowing agent per 100 parts of resin are used.

Different coagents can be utilized to reduce the cycle time by increasing the cross-linking rate. Known blowing agent activator and release agents as well as fillers may be used such as, for example, zinc stearate, stearic acid, and zinc oxide.

A mixture of the selected resin, cross-linking agent and chemical blowing agent can be blended by any suitable means including, for example, a high shear mixer or kneader such as a Banbury mixer. An extrusion apparatus, such as a conventional twin-screw or multiple-screw extruder, can also be used for blending.

Further details of cross-linking foamed compositions are provided in U.S. patent application Ser. No. 08/639,717; filed Apr. 29, 1996, now U.S. Pat. No. 5,700,407 which is a continuation of U.S. patent application Ser. No. 08/389,462; filed Feb. 14, 1995, and which is incorporated herein by reference.

The method of the present invention includes the time sequencing of several steps including: 1) introducing an inert gas into the mold chamber; 2) introducing a mixture of resin, cross-linking agent and chemical blowing agent into the mold; 3) evacuating the inert gas from the mold chamber; 4) heating the mixture within the mold to a predetermined temperature sufficient to thermally decompose the chemical blowing agent; and 5) maintaining the mixture at the predetermined elevated temperature until the resin is substantially cross-linked. One skilled in the art would recognize that the time sequencing must be varied in accordance with the particular configuration of the injection molding machine and mold chamber used.

Figure 2:
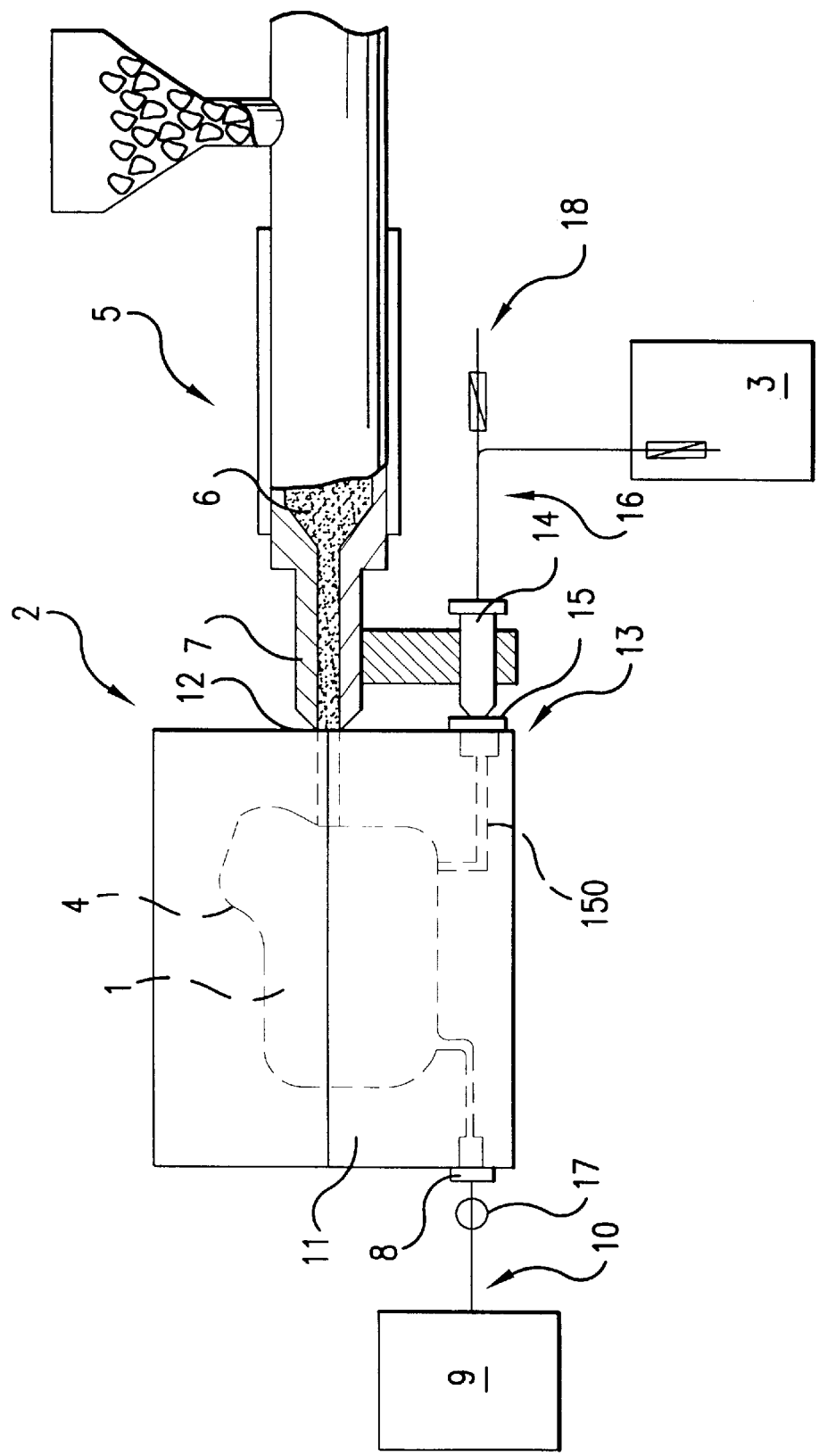
FIG. 2 is a schematic representation of the apparatus used to practice a second embodiment of the present invention.

With reference to FIGS. 1 and 2, an inert gas is introduced into a chamber 1 of a preheated mold 2 to evacuate virtually all air, and particularly oxygen, from mold chamber 1. Preheated mold 2 is preheated to a temperature higher than the decomposition temperature of the particular chemical blowing agent selected. For example, preheated mold 2 is heated to at least 160° C. for the preferred modified azodicarbonamide chemical blowing agent. In the preferred embodiment, the chemical blowing agent and the cross-linking agent are selected to have substantially the same decomposition and activation temperature, respectively.

The inert gas is introduced into preheated mold 2 at a pressure above approximately 1 psi. Inert gas at pressures ranging between about 1 to 2000 psi may be utilized, however, gases at lower pressures between approximately 1 to 12 psi, as measured within mold 2, are preferred. Lower pressures are more efficient and economical because less gas is used. Still further, inert gas at pressures in the range of approximately 3 to 6 psi, as measured within mold 2, is preferred for use with the preferred embodiments. Any inert gas such as argon, helium, and nitrogen may be used, however, the use of nitrogen is preferred. Nitrogen, for example, may be provided by any suitable means including by radiators which turn liquid nitrogen into gas and/or by nitrogen generators.

The supplied inert gas flows into chamber 1 of preheated mold 2 through a passageway fluidly connected with inert gas supply unit 3. For example, the inert gas flows into the chamber through venting 8 in the embodiment of FIG. 1 and through a passageway 150 in the embodiments of FIG. 2 and FIG. 3. The inert gas flows for a predetermined amount of time to evacuate substantially all air and oxygen from mold chamber 1 including all air present in deep cavities 4 and other complex shapes of mold chamber 1. A flow of inert gas up to approximately 12 seconds is typically sufficient to expunge the mold chamber of oxygen, although longer periods of time can be employed with no detrimental effects. Limiting the flow of inert gas to a shorter period of time is preferred, however, because less inert gas is necessary. In particular, limiting the flow of inert gas to approximately 4 to 6 seconds has been found to be sufficient in many applications.

An injector 5 introduces a mixture 6 of the selected resin, cross-linking agent and chemical blowing agent into the evacuated mold chamber 1. Mixture 6 is provided at a temperature that is lower than the respective decomposition and activation temperatures of the chemical blowing agent and the cross-linking agent such that the chemical reaction that causes foaming of the resin does not commence until mixture 6 enters the heated mold chamber 1. A temperature of approximately 90° C. is sufficiently low to prevent foaming of the preferred mixture, however, a range of temperatures between 80–100° C. may also be used depending upon the particular chemical blowing agent and cross-linking agent selected as would be apparent to one skilled in the art. Maintaining a nozzle 7 of injector 5 at this lower temperature also reduces premature foaming of mixture 6. The flow of inert gas may be stopped preceding, concurrently with, or following the introduction of mixture 6 into the preheated mold chamber 1.

Once the flow of inert gas into mold chamber 1 is stopped, the inert gas is evacuated though venting 8 of preheated mold 2. At this point, mixture 6, alone, is sufficient to evacuate the mold chamber 1 because mixture 6 will push the inert gas out through venting 8.

An optional conventional vacuum system 9 fluidly connected to venting 8 by a vacuum line 10 may draw the inert gas out of mold chamber 1. Although the use of a vacuum system is not essential, it is beneficial in reducing the amount of voids in the final molded product caused by inert gas remaining in the preheated mold 2 as the resin of mixture 6 is cross-linked. Typically, a vacuum in the range of 15 inHg to about 29 inHg is sufficient evacuate the mold chamber 1, with the preferred vacuum to be about 28 inHg.

Mixture 6 within mold chamber 1 is heated to the predetermined elevated temperature of preheated mold 2. Mixture 6 is heated to a temperature which is sufficient to thermally decompose the chemical blowing agent. Once the temperature of mixture 6 is above the decomposition temperature of the chemical blowing agent, the chemical blowing agent chemically reacts to produce pressure within the mixture thereby allowing mixture 6 to foam once mold 2 opens.

Mixture 6 remains within preheated mold 2 for a predetermined amount =of time to cause the cross-linking agents of mixture 6 to chemically react, thereby forming a substantially cross-linked composition. Generally, for ethylene vinyl acetate copolymers with a dicumyl peroxide cross-linking agent, a period of about 5 to about 15 minutes is adequate for the desired cross-linking to occur, depending on cross-sectional thickness of mold chamber 1 and temperature of preheated mold 2.

The present inventive method permits the preparation of low density closed cell foam composition having a density of as low as 0.05–0.10 gm/cc, a uniform cell structure throughout, and a smooth skin. The present method also permits the manufacture of complex foamed shapes virtually free of undesirable oxidation and discoloration. Accordingly, the present invention can be used for making parts for footwear and orthopedic products such as midsoles, outsoles, or sockliners. The method is also suitable for producing other foamed products in which complex shapes free of discoloration are desired, for example, foamed vehicle components such as wheels for baby carriages and tricycles; floatation devices such as keychains; insulation for coolers and beverage containers; sporting good components such as padding for helmets and other protective pads; automotive parts such as visors and dashboards; and similar applications in which low densities, and complex shape free of bums and discolorations due to oxidation are desired.

The present invention is further illustrated by the following specific examples.

EXAMPLE I

Referring to FIG. 1, a "vacuum method" of the present invention is especially suitable for use with existing injection molding machinery. It requires some modification to existing injection molding machines having a conventional vacuum system and no modification of the hot mold. One skilled in the art would recognize that injection molding machines could be further modified with solenoids, limit switches and PLC sequence changes in order to automate the method.

A nitrogen supply unit 3 is spliced or otherwise fluidly connected to the existing vacuum system 9 of an injection molding machine. Nitrogen supply unit 3 includes solenoid valves for controlling the supply of nitrogen to the vacuum system 9. Nitrogen is introduced into mold chamber 1 through venting 8 of vacuum system 9 located at a first, front end 11 (the vent end) of preheated mold 2. The flow of nitrogen into mold chamber 1 continues at a pressure of approximately 4–6 psi, as measured within the mold, for approximately 4–12 seconds and thereby replaces all the air and oxygen present in mold chamber 1. A pressure gauge 17 is provided to determine the pressure or vacuum within preheated mold 2.

The injection of mixture 6 into preheated mold 2 is held back until the flow of nitrogen is stopped. As nozzle 7 of injector 5 meets runner 12 of preheated mold 2, vacuum system 9 is activated for 2–3 seconds. Mixture 6 of the selected resin, cross-linking agent and chemical blowing agent is then injected into a second, rear end 13 of preheated mold 2. While the vacuum provided by vacuum system 9 continues to evacuate the nitrogen from mold chamber 1, mixture 6 flows toward the first end 11 of preheated mold 2. Mixture 6 thus displaces the inert gas and allows the nitrogen to escape through vacuum line 10. Although only one vent is shown for illustrative purposes, it is noted that multiple vents may be utilized to vent deeper cavities 4 and the like.

Because mixture 6 is injected from second end 13 of preheated mold 2 and the nitrogen is injected in the opposite direction from first end 11, care must be taken to minimize voids in the molded composition. As such, the nitrogen should not be flowing, and the vacuum should be on, while mixture 6 is injected into mold chamber 1 to minimize voids.

Mixture 6 fills preheated mold 2 and is maintained within preheated mold 2 until the temperature of mixture 6 is sufficient to activate the chemical blowing agent. Mixture 6 is further maintained within the preheated mold 2 until the resin is substantially cross-linked or cured. The molded cross-linked composition is then released from the preheated mold 2 and foams thereby producing the final product. A compressed air line 18 may then momentarily provide compressed air at a pressure of approximately 80–135 psi to purge the vacuum line 10 of any material that may be remaining in vacuum line 10 and venting 8 after the molded composition is released from the mold 2. Pressure up to 1500 psi may be used, if necessary depending upon the complexity of the shape, to purge material from vacuum line 10. In one embodiment, a nitrogen generator is provided to supply 1500 psi for purging vacuum line 10 and venting 8. The nitrogen generator includes a programmable controller for sequencing different pressures and time periods at which the nitrogen is supplied.

EXAMPLE II

Referring to FIG. 2, a "runner method" of the present invention requires more modification to existing injection molding machinery than the vacuum method described above. This method may also be automated in the same manner as the vacuum method above. The runner method requires the mounting of an inert gas injector head 14 adjacent the second end 13 of preheated mold 2. A cooperating inlet 15 is also provided on the second end 13 of the preheated mold 2. Inert gas injector head 14 is preferably mounted to the nozzle 7 of the injector 5. This embodiment requires no modification of the vacuum systems conventionally utilized on hot-mold injection molding machines, such as vacuum system 9.

As nozzle 7 nears runner 12, injector head 14 engages inlet 15 located at second end 13 of preheated mold 2. Nitrogen is introduced into mold chamber 1 through inlet 15 and thus flows from second end 13 toward venting 8 located in first end 11. The nitrogen may be introduced through a sintered disk (not shown) to prevent plugging. The sintered disk is preferably a 5–10 micron sintered disk which allows inert gas and air but not the mixture to pass through. Preferably, a nitrogen generator is used when a sintered disk is used because higher pressures of inert gas are necessary for the inert gas to pass through the sintered disk.

Vacuum system 9 may be turned on to draw the flow of nitrogen into mold chamber 1. Nitrogen at a pressure of approximately 4–6 psi, as measured in mold 2 by gauge 17, flows for approximately 4–12 seconds and thereby replaces all the air and oxygen present in mold chamber 1.

While the nitrogen is still flowing through preheated mold 2, injector nozzle 5 contacts preheated mold 2 and seals it.

Once injector nozzle 5 seals preheated mold 2, and after a 3–4 second delay during which nitrogen fills mold chamber 1, vacuum system 9 is activated for 2–3 seconds providing a vacuum of approximately 28 inHg to remove as much nitrogen as possible. Mixture 6 of the selected resin, cross-linking agent and chemical blowing agent is then injected into second end 13 (the runner end) of mold 2 and thus flows in the same direction as the nitrogen. While vacuum system 9 continues to evacuate the nitrogen in mold chamber 1, mixture 6 flows toward first end 11 of preheated mold 2 thus displacing the gas and allowing the nitrogen to escape. In the runner method, the flow of nitrogen may continue at a lower pressure. For example, the continued flow of nitrogen at 2 psi maintains a positive pressure in preheated mold 2 thereby preventing vacuum system 9 from pulling air back into evacuated preheated mold 2.

In the same manner as the vacuum method, mixture 6 fills preheated mold 2 and is maintained within preheated mold 2 until the temperature of the mixture is sufficient to activate the chemical blowing agent. The mixture is further maintained within preheated mold 2 until the resin is substantially cross-linked or cured. The molded cross-linked composition is then released from mold 2 and foams, thereby producing the final product. The pressure in vacuum lines 10 and inert gas lines 16 is then momentarily increased, by any suitable means, to approximately 80–135 psi to purge vacuum lines 10 and inert gas lines 16 of any material that may be remaining in the inlet and the venting after the molded composition is released from preheated mold 2. If a sintered disk is utilized, higher pressures, up to 2000 psi, may be necessary to purge the sintered disk of any material that may be remaining in the sintered disk, the inlet, and the venting after the molded composition is released.

EXAMPLE III

Figure 3:
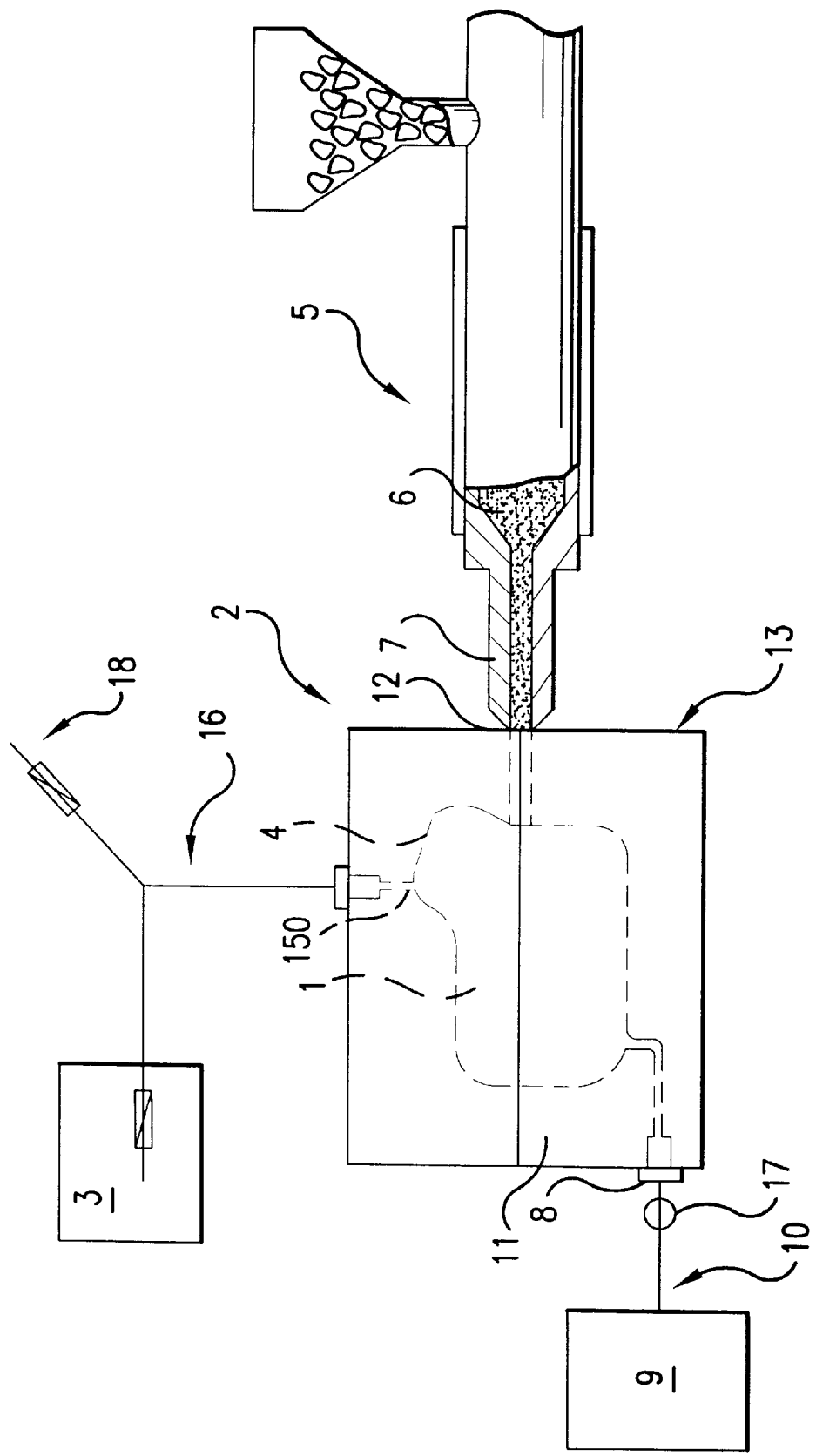
FIG. 3 is a schematic representation of the apparatus used to practice a third embodiment of the present invention.

Referring to FIG. 3, a "top method" of the present invention also requires some modification to existing injection molding machinery. This method provides direct connection of inert gas line 16 to inlet 15 which is located on the top of preheated mold 2. This embodiment, like the runner method above, requires no modification of the vacuum systems conventionally utilized on hot-mold injection molding machines, such as vacuum system 9. This method may also be automated in the same manner as the vacuum and runner methods above.

Nitrogen is introduced into mold chamber 1 through inlet 15 as mold 2 is closing. Nitrogen thus flows from the top of mold chamber 1 and blankets mold chamber 1 and the lower half of mold 2. Vacuum system 9 may be turned on to draw the flow of nitrogen into mold chamber 1, however, only a reduced vacuum is necessary if vacuum system 9 is used. Nitrogen at a pressure of approximately 5–12 psi flows for approximately 3–4 seconds before nozzle 7 of injector 5 meets mold 2 thereby replacing all the air and oxygen present in mold chamber 1.

Nozzle 7 of injector 5 then contacts preheated mold 2 and seals mold 2. Nitrogen continues to flow through preheated mold 2 for 1–2 seconds before mixture 6 is injected into mold 2. The nitrogen is stopped as mixture 6 of the selected resin, cross-linking agent and chemical blowing agent is injected into second end 13 (the runner end) of mold 2. Mixture 6 flows toward first end 11 of preheated mold 2 thus displacing the gas and allowing the nitrogen to escape. Vacuum system 9, if used, is activated for 2–3 seconds after mixture 6 begins to flow into mold 2. Vacuum system 9 only provides a reduced vacuum of approximately 15–20 inHg to remove as much nitrogen as possible without drawing oxygen back into mold chamber 1.

In another embodiment, instead of stopping the flow of nitrogen completely, the flow of nitrogen may continue at a lower pressure in the same manner as in the runner method above. For example, a continued flow of nitrogen at 2 psi maintains a positive pressure in preheated mold 2 thereby preventing vacuum system 9, if used, from pulling air back into evacuated preheated mold 2.

In the same manner as the vacuum and runner methods, mixture 6 fills preheated mold 2 and is maintained within preheated mold 2 until the temperature of the mixture is sufficient to activate the chemical blowing agent. The mixture is further maintained within preheated mold 2 until the resin is substantially cross-linked or cured. The molded cross-linked composition is then released from mold 2 and foams thereby producing the final product. The pressure in vacuum lines 10 and inert gas lines 16 is then momentarily increased, by any suitable means, to 80–135 psi to purge vacuum lines 10 and inert gas lines 16 of any material that may be remaining in the inlet and the venting after the molded composition is released from preheated mold 2.

Depending upon various factors including, for example, the size of mold chamber 1 and the complexity of its shape, the time sequencing of the several steps may be varied to maximize efficiency. For example, allowing the nitrogen to flow for 15 seconds at a lower pressure of 2 to 3 psi may produce better results with a particular machine/mold combination than the above examples. Although lower pressures use less nitrogen and are therefore less expensive, this invention does not need to be limited to lower pressures. A high pressure "shot" of nitrogen at, for example, 2000 psi for a fraction of a second may likewise be most efficient for expunging air and oxygen from a particular machine/mold combination. Any pressure of inert gas may work, however, a pressure of approximately 1 to 12 psi has been found to be effective, and pressures within the range of 3 to 6 psi are preferred.

The inventive method may be controlled manually, however as noted above, one skilled in the art would recognize that the process may also be automated. The time sequencing may be electronically controlled with the use of limit switches (not shown) and solenoid valves provided in the inert gas supply unit.

It is noted that the illustrative examples are a single purge method wherein the flow of inert gas was activated only once. Multiple purge methods may also be utilized to expunge all air from larger and more complex mold chambers by repeating the nitrogen introducing and evacuating steps. Dependent upon the particular combination of injection molding machines and hot molds used, multiple purge methods using single or double pressurization of the inert gas may also be used to effectively expunge air from the mold chamber. For example, single pressurization at a uniform pressure may be sufficient for molds having simple shapes. Molds having increasingly complex shapes and deeper cavities may, however, require an initial higher pressure of inert gas, e.g., 20 psi, to expunge most of the air from the mold chamber, whereas only a subsequent low pressure is necessary, e.g., 2 psi, to prevent the vacuum system from drawing air back into the mold chamber. In this case, the vacuum may be set to produce a slight vacuum of 10 inHg to avoid pulling air back into the mold. Also, as noted above, a higher inert gas pressure may also clean any unwanted material from the inlet as the final component is released from the mold.

An alternative example of a multiple purge sequence well suited for the runner method may comprise the following steps: 1) preheating and closing the mold; 2) introducing nitrogen at a pressure of approximately 10 psi; 3) activating the vacuum system; 4) reducing the pressure of nitrogen to approximately 2 psi; 5) injecting the mixture into the mold; 6) stopping the flow of nitrogen; 7) stopping the vacuum system; 8) maintaining the mixture in the mold to heat and cure the mixture; 9) releasing the final molded cross-linked composition from the mold; and 10) providing air or nitrogen at a pressure of approximately 80–135 psi to purge vacuum lines 10 and inert gas lines 16 of any remaining material.

Although the present method has been described in some detail by way of illustration an example for purposes of clarity and understanding, it will, of course, be understood that various changes and modifications may be made without departing from the scope of the invention as set forth in the following claims.

What is claimed is:

1. A method for injection-molding a cross-linked, foamed composition, comprising the steps of:

introducing an inert gas into a chamber of a preheated mold for a predetermined period of time;

stopping the flow of said inert gas into said chamber after said predetermined period of time;

providing a vacuum, after the flow of the inert gas has stopped, to evacuate said inert gas and air from said chamber;

introducing a mixture of a resin, a cross-linking agent and a chemical blowing agent, into said chamber, after said inert gas and said air have been substantially evacuated from said chamber;

heating said mixture within said chamber to a temperature sufficient to thermally decompose said chemical blowing agent; and maintaining said temperature of said mixture until said resin is substantially cross-linked.

2. The method of claim 1, further comprising the step of:

providing a vacuum during said step of introducing said mixture into said chamber.

3. The method of claim 1, wherein said introducing an inert gas step comprises introducing said inert gas into said chamber for up to approximately 12 seconds.

4. The method of claim 1, wherein said introducing an inert gas step comprises introducing said inert gas into said chamber for approximately 4–12 seconds.

5. The method of claim 1, wherein said inert gas is nitrogen.

6. The method of claim 1, wherein said resin is a polyolefin.

7. The method of claim 1, wherein said cross-linking agent is one of a peroxide, sulphur, or a mixture thereof.

8. The method of claim 7, wherein said cross-linking agent is dicumyl peroxide.

9. The method of claim 1, wherein said chemical blowing agent is one of azobisisobutyronitrile, azodicarbonamide, P-toluene sulfonylhydrazide, 4,4'-oxybis(benzenesulfonyhydrazide), N,N-dinitrosopentamethylenetetramine, sodium bicarbonate, and a mixture thereof.

10. The method of claim 1, wherein said maintaining step comprises maintaining said temperature of said mixture for approximately 1–20 minutes.

11. The method of claim 1, wherein said maintaining step comprises maintaining said temperature of said mixture for approximately 5–15 minutes.

12. The method of claim 1, wherein said inert gas virtually eliminates air within said chamber to reduce oxidation of said compound during preheated molding.

13. The method of claim 1, wherein said resin is ethylene vinyl acetate.

14. The method of claim 1, wherein inert gas is introduced into said chamber at a pressure of approximately 1 to 2500 psi.

15. The method of claim 1, wherein said inert gas is introduced into said chamber at a pressure of approximately 1 to 12 psi.

16. The method of claim 1, wherein said inert gas is introduced into said chamber at a pressure of approximately 3 to 6 psi.

17. The method of claim 1, wherein said mixture introducing step continues concurrently with said providing a vacuum step.

18. The method of claim 1, wherein said providing a vacuum step comprises maintaining said vacuum in the range of approximately 10 inHg to 29 inHg.

19. The method of claim 1, wherein said providing a vacuum step comprises maintaining said vacuum in the range of approximately 15 inHg to 28 inHg.

20. The method of claim 1, further comprising the step of:

releasing said cross-linked mixture from said mold by introducing a second gas into said chamber of said mold to purge any remaining material.

21. The method of claim 20, wherein said second gas is introduced into said chamber at a pressure of approximately 1 to 1500 psi.

22. The method of claim 20, wherein said second gas is introduced into said chamber at a pressure of approximately 80 to 135 psi.

23. A method for injection-molding a cross-linked, foamed composition, in a mold comprising the steps of:

introducing an inert gas into a chamber of a preheated mold;

providing a vacuum to pull said inert gas into said chamber;

sealing said preheated mold;

providing a vacuum for a predetermined period of time to evacuate substantially all of said inert gas and air from said chamber;

introducing a mixture of a resin, a cross-linking agent and a chemical blowing agent, into said chamber, after said inert gas and said air have been substantially evacuated from said chamber;

heating said mixture within said chamber to a temperature sufficient to thermally decompose said chemical blowing agent; and maintaining said temperature of said mixture until said resin is substantially cross-linked.

24. The method of claim 23, wherein said inert gas is introduced into said chamber via an inlet formed at the top of said preheated mold.

25. The method of claim 23, wherein said inert gas is introduced into said chamber in the same direction in which said mixture is introduced into said chamber.

26. The method of claim 23, wherein said inert gas is introduced into said chamber in a direction opposite to the direction in which said mixture is introduced into said chamber.

27. The method of claim 23, wherein said inert gas is introduced into said chamber through a sintered disk.

28. The method of claim 23, wherein said inert gas introducing step further comprises the step of reducing the pressure at which said inert gas is introduced upon commencement of said providing a vacuum step.

29. The method of claim 23, wherein said inert gas introducing step is terminated prior to commencement of said providing a vacuum step.

30. The method of claim 23, wherein said introducing an inert gas step comprises introducing said inert gas into said chamber for up to approximately 12 seconds.

31. The method of claim 23, wherein said introducing an inert gas step comprises introducing said inert gas into said chamber for approximately 4–12 seconds.

32. The method of claim 23, wherein said inert gas is nitrogen.

33. The method of claim 23, wherein said resin is a polyolefin.

34. The method of claim 23, wherein said cross-linking agent is one of a peroxide, sulphur, or a mixture thereof.

35. The method of claim 34, wherein said cross-linking agent is dicurnyl peroxide.

36. The method of claim 23, wherein said chemical blowing agent is one of azobisisobutyronitrile, azodicarbonamide, P-toluene sulfonylhydrazide, 4,4'-oxybis(benzenesulfonyhydrazide), N,N-dinitrosopentarnethylenetetramine, sodium bicarbonate, and a mixture thereof.

37. The method of claim 23, wherein said maintaining step comprises maintaining said temperature of said mixture for approximately 1–20 minutes.

38. The method of claim 23, wherein said maintaining step comprises maintaining said temperature of said mixture for approximately 5–15 minutes.

39. The method of claim 23, wherein said inert gas virtually eliminates air within said chamber to reduce oxidation of said compound during preheated molding.

40. The method of claim 23, wherein said resin is ethylene vinyl acetate.

41. The method of claim 23, wherein inert gas is introduced into said chamber at a pressure of approximately 1 to 2500 psi.

42. The method of claim 23, wherein said inert gas is introduced into said chamber at a pressure of approximately 1 to 12 psi.

43. The method of claim 23, wherein said inert gas is introduced into said chamber at a pressure of approximately 3 to 6 psi.

44. The method of claim 23, wherein said mixture introducing step continues concurrently with said providing a vacuum step.

45. The method of claim 23, wherein said providing a vacuum step comprises maintaining said vacuum in the range of approximately 10 inHg to 29 inHg.

46. The method of claim 23, wherein said providing a vacuum step comprises maintaining said vacuum in the range of approximately 15 inHg to 28 inHg.

47. The method of claim 23, further comprising the step of:
releasing said cross-linked mixture from said mold by introducing a second gas into said chamber of said mold to purge any remaining material.

48. The method of claim 47, wherein said second gas is introduced into said chamber at a pressure of approximately 1 to 1500 psi.

49. The method of claim 47, wherein said second gas is introduced into said chamber at a pressure of approximately 80 to 135 psi.

* * * * *